United States Patent [19]
Anderson et al.

[11] 3,717,632
[45] Feb. 20, 1973

[54] SUBSTITUTED-3-HYDRAZINO PYRIDAZINES

[75] Inventors: Paul L. Anderson, Dover; William J. Houlihan; Robert E. Manning, both of Mountain Lakes, all of N.J.

[73] Assignee: Sandoz-Wander, Inc., Hannover, N.J.

[22] Filed: Jan. 29, 1971

[21] Appl. No.: 111,107

Related U.S. Application Data

[63] Continuation-in-part of Ser. No. 858,157, Sept. 15, 1969.

[52] U.S. Cl. ..........................260/250 A, 424/250
[51] Int. Cl. .............................................C07d 51/04
[58] Field of Search.....................260/250 A

[56] References Cited

UNITED STATES PATENTS

| | | | |
|---|---|---|---|
| 3,579,517 | 5/1971 | Houlihan et al. | 260/250 A |
| 3,586,681 | 6/1971 | Houlihan | 260/250 A |

*Primary Examiner*—Nicholas S. Rizzo
*Attorney*—Gerald D. Sharkin, Frederick H. Weinfeldt, Robert S. Honor, Walter F. Jewell, Richard E. Vila and Thomas O. McGovern

[57] ABSTRACT

6-Chloro-pyridazines substituted at the 3-position, e.g., 6-chloro-3-[2-(hept-4-ylidene)-hydrazino]-pyridazine are prepared from 6-chloro-3-hydrazino-pyridazines and carbonyl compounds and exhibit antiinflammatory and anti-hypertensive activity.

12 Claims, No Drawings

SUBSTITUTED-3-HYDRAZINO PYRIDAZINES

This is a continuation-in-part of copending application, Ser. No. 858,157, filed Sept. 15, 1969.

This invention concerns novel heterocyclic compounds and more particularly substituted-3-hydrazino pyridazines. Still more particularly, this invention concerns 6-chloro-3-substituted hydrazino pyridazines, acid addition salts thereof, and methods for their preparation.

The compounds of this invention may be represented by the formula:

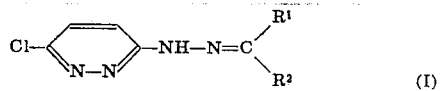
(I)

where $R^1$ and $R^2$ each independently, represents hydrogen, lower alkyl having one to six carbon atoms, such as methyl, ethyl, isopropyl, or butyl or lower alkenyl having two to five carbon atoms such as allyl or vinyl, provided that when one of $R^1$ or $R^2$ is hydrogen, the other represents lower alkyl having two to six carbon atoms or lower alkenyl having two to five carbon atoms, and pharmaceutically acceptable acid addition salts thereof.

The preferred compounds of Formula (I) are those in which $R^1$ and $R^2$ each independently represent lower alkyl having one to six carbon atoms or lower alkenyl having 2 to 5 carbon atoms or pharmaceutically acceptable acid addition salts thereof. Especially preferred compounds are those in which at least one of $R^1$ or $R^2$ is lower alkenyl having two to five carbon atoms.

The process for preparing the compounds of Formula (I) may be represented by the following reaction sceme:

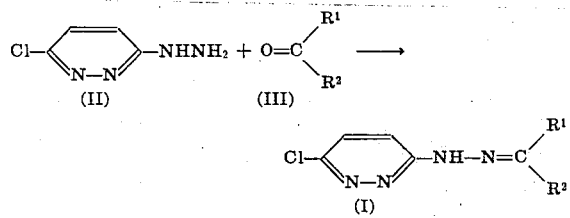

where $R^1$, $R^2$ and the proviso are as set out above.

Compounds of Formula (I) are prepared by treating 6-chloro-3-hydrazino-pyridazine (II) with the carbonyl compounds of Formula (III). Normally, the reaction is carried out at a temperature of about 0° to 80° C., preferably 10° to 30° C., especially 20° to 25° C. for about 1 to 4 hours. Although not necessary, an inert solvent may be used such as lower alkanol, especially methanol or ethanol, and aromatic or saturated aliphatic hydrocarbons, especially benzene, toluene, and the like. When feasible, excess reactant (III) may be used as solvent. Neither the temperatures nor the solvent used are critical in obtaining the product (I). The pyridazines of Formula (I) may be recovered using conventional techniques.

The compound of Formula (II) is known and may be prepared by methods disclosed in the literature. Certain of the compounds of Formula (III) are also known and may be prepared by methods disclosed in the literature. Those compounds of Formula (III) not specifically disclosed in the art are prepared according to analogous methods from known materials.

Another aspect of this invention concerns pharmaceutical compositions comprising a compound of the formula:

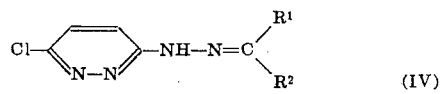
(IV)

where $R^1$ and $R^2$ independently, represent hydrogen, lower alkyl having one to six carbon atoms or lower alkenyl having two to five carbon atoms, or a pharmaceutically acceptable acid addition salt thereof, and a pharmaceutically acceptable carrier or diluent therefor.

The compounds represented by Formula (I) and (IV) above are useful because they possess pharmaceutical properties in animals. In particular, these compounds are useful as anti-/inflammatory agents, as indicated by their activity in rats given 25 mg/kg of active compound orally and tested using the acute carrageenan-induced edema procedure substantially as described by Winter (Proc. Soc. Exp. Biol., 111 : 544; 1962).

Compounds (I) and (IV) are also useful as hypotensive/antihypertensive agents, as indicated by their activity in anesthetized dogs using a modification of the method described by Markowitz (Exper. Surgery, Williams & Wilkins, 2nd Ed., 1949) in which blood pressure is measured with a mercury manometer or transducer via a catheter inserted in either the carotid or femoral artery of the animal, and by their activity in the Grollman rat (A. Grollman Proc. Soc. Exp. Biol. and Med. 57:103, 1944) in which the blood pressure from the caudal artery in the tail of the rat is indirectly measured using a pneumatic pulse transducer.

When so utilized, the compounds may be combined with one or more pharmaceutically acceptable carriers or adjuvants. They may be administered orally or parenterally; and depending upon the compound employed and the mode of administration, the anti-inflammatory effective or anti-hypertensive effective dosage will vary. Furthermore, compounds (I) may be similarly administered in the form of their non-toxic pharmaceutically acceptable acid addition salts. Such salts possess the same order of activity as the free base and are readily prepared by standard methods as indicated above. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like.

In general, satisfactory results are obtained when these compounds are administered in the treatment of inflammation at a daily dosage of about 10 milligrams to about 100 milligrams per kilogram of animal body weight. This daily dosage is preferably administered 2 to 4 times a day, or in sustained release form. For most large mammals in need of such treatment, such as primates, the total daily dosage is from about 150 milligrams to about 750 milligrams. Dosage forms suitable for internal use comprise from about 38 milligrams to about 375 milligrams of the active compound in intimate admixture with a solid or liquid pharmaceutically acceptable carrier or diluent.

When the compounds are administered in the treatment of hypertension, satisfactory results are obtained at daily dosages of about 1.0 milligram to about 200 milligrams per kilogram of animal body weight, preferably. This daily dosage is preferably administered 2 to 4 times a day or in sustained release form. For most large animals in need of such treatment, such as primates, the total daily dosage is from about 50 milligrams to about 1,000 milligrams. Dosage forms suitable for internal use comprise from about 12.5 to about 500 milligrams of the active compound in intimate admixture with a solid or liquid pharmaceutically acceptable carrier or diluent.

A representative formulation suitable for oral administration is a tablet prepared by standard tabletting techniques which contains the following:

| Ingredients | Parts by Weight |
|---|---|
| 6-chloro-3-(2-isopropylidine-hydrazino)-pyridazine | 10 |
| tragacanth | 2 |
| lactose | 79.5 |
| corn starch | 5 |
| talcum | 3 |
| magnesium stearate | 0.5 |

EXAMPLE 1

6-chloro-3-[2-(hept-4-ylidene)-hydrazino]-pyridazine

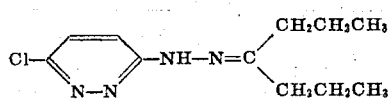

To an ice bath cooled solution of 4.0 g of 6-chloro-3-hydrazinopyridazine in 60 ml. of methanol is added slowly 32.6 g of 4-heptanone. The mixture is then allowed to warm to room temperature and stirred for about 2 hours. The solvent is evaporated at reduced pressure and the residue chilled to induce crystallization of 6-chloro-3-[2-(hept-4-ylidene)-hydrazino]pyridazine; m.p. 100°–103° C. The base is dissolved in methanol, and hydrogen chloride gas is bubbled through the solution for one-half hour at room temperature. The product obtained is 6-chloro-3-[2-(hept-4-ylidene) hydrazino]-pyridazine monohydrochloride; m.p. 129°–131° C.

When the above procedure is carried out with pentanone-2 in place of 4-heptanone, there is obtained 6-chloro-3-[2-(pent-2-ylidene)-hydrazino]-pyridazine hydrochloride; mp 102° to 106° C.

EXAMPLE 2

6-chloro-3-(2-isopropylidene-hydrazine)-pyridazine

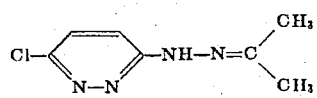

To 250 ml. of acetone is added 15.0 g of 6-chloro-3-hydrazinopyridazine and the mixture warmed until all the solid dissolves. The mixture is then stirred 2 hours at room temperature and part of the solvent is evaporated. The mixture is cooled and the precipitate collected by filtration. A second crop is collected after evaporation of more of the solvent. The product, 6-chloro-3-(2-isopropylidene-hydrazino)-pyridazine melts at 159°–161° C. The base is dissolved in methanol, and hydrogen chloride gas is bubbled through the solution for one-half hour at room temperature. The product obtained is 6-chloro-3-(2-isopropylidene-hydrazino)-pyridazine hydrochloride; m.p. 166°–168° C.

When essentially the same procedure as above is carried out using 1-pentene-4-one or diallylketone dissolved in methanol in place of the acetone, there is obtained 6-chloro-3-(2-[1-penten-4-yildene]-hydrazino)-pyridazine -hydrazino)-pyridazine or 6-chloro-3-(2-[1,6-pentadien-4-ylidene]-hydrazino)-pyridazine, respectively.

EXAMPLE 3

6-chloro-3-(2-propylidene-hydrazino)-pyridazine

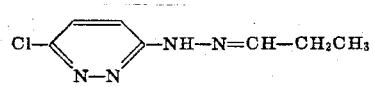

To an ice bath cooled solution of 1.45 g of 6-chloro-3-hydrazinopyridazine in 25 ml of methanol is added slowly 8.1 g of propionaldehyde. The mixture is allowed to warm to room temperature and is then stirred for 2 hours. The resultant precipitate is collected and, after successive evaporations of portions of the solvent, second and third crops are collected to provide 6-chloro-3-(2-propylidene-hydrazino)-pyridazine; mp 156° to 158° C. The base is dissolved in methanol, and hydrogen chloride gas is bubbled through the solution for one-half hour at room temperature. The product obtained is 6-chloro-3-(2-propylidene-hydrazino)-pyridazine hydrochloride; mp 155° to 157° C.

When the above procedure is carried out with butyraldehyde or butene-2-aldehyde in place of propionaldehyde, there is obtained 6-chloro-2-(2-butylidene-hydrazino)-pyridazine hydrochloride; mp 99° to 102° C. or 6-chloro-3-[2-(butene-2-ylidene)-hydrazino]-hydrazino]-pyridazine; mp 201° to 202° C., respectively.

What is claimed is:

1. A compound of the formula

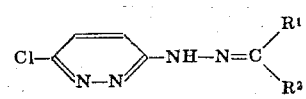

where $R^1$ and $R^2$ each independently represent hydrogen, lower alkyl having one to six carbon atoms, or lower alkenyl having two to five carbon atoms, provided that when one or $R^1$ or $R^2$ is hydrogen, the other represents lower alkyl having two to six carbon atoms or lower alkenyl having two to five carbon atoms or a pharmaceutically acceptable acid addition salt thereof.

2. A compound according to claim 1 wherein $R^1$ and $R^2$ each independently represent lower alkyl having one to six carbon atoms or lower alkenyl having two to five carbon atoms, or a pharmaceutically acceptable acid addition salt thereof.

3. A compound according to claim 1 in which at least one of $R^1$ or $R^2$ is alkenyl having two to five carbon atoms or a pharmaceutically acceptable acid addition salt thereof.

4. The compound of claim 1 which is 6-chloro-3[2-hept-4-ylidene)hydrazino]pyridazine.

5. The compound of claim 1 which is 6-chloro-3-(2-[1-penten-4-ylidene]-hydrazino)-pyridazine.

6. The compound of claim 1 which is 6-chloro-3-(2-[1,6-pentadien-4-ylidene]-hydrazino)-pyridazine.

7. The compound of claim 1 which is 6-chloro-3[2-(pent-2-ylidene)hydrazino]pyridazine hydrochloride.

8. The compound of claim 1 which is 6-chloro-3-(2-isopropylidene-hydrazino)pyridazine.

9. The compound of claim 1 which is 6-chloro-3-(2-propylidene-hydrazino)pyridazine.

10. The compound of claim 1 which is 6-chloro-3-(2-butylidene-hydrazino)pyridazine.

11. The compound of claim 1 which is 6-chloro-3-[2-(butene-2-ylidene)hydrazino]pyridazine.

12. A process for preparing the compounds of claim 1 in free base form which comprises treating a compound of the formula

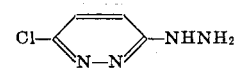

with a compound of the formula

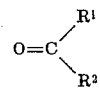

where $R^1$, $R^2$ and the proviso are as set out in claim 1.

* * * * *